United States Patent [19]

Gavin

[11] Patent Number: 5,592,785
[45] Date of Patent: Jan. 14, 1997

[54] HANDLE FOR SUBTERRANEAN CONCRETE COVERS

[76] Inventor: Norman W. Gavin, 2545 Ridge Rd., North Haven, Conn. 06473

[21] Appl. No.: 392,357

[22] Filed: Feb. 17, 1995

[51] Int. Cl.[6] ................................................ F02D 29/14
[52] U.S. Cl. ........................ 52/20; 52/125.4; 52/689; 16/125
[58] Field of Search .......................... 52/686, 689, 20, 52/21, 169.6, 125.2, 125.4, 125.3, 139, 138, 137, 133, 135, 140, 141, 142, 19, 124.1, 125.1, 125.5; 404/25, 26; 16/DIG. 19, DIG. 18, DIG. 12, 119, 125

[56] References Cited

U.S. PATENT DOCUMENTS

| | | | |
|---|---|---|---|
| 447,662 | 3/1891 | Butler | 52/124.1 |
| 921,554 | 5/1909 | Millhouse | 52/140 |
| 1,832,409 | 11/1931 | Mueller | 16/125 |
| 1,832,611 | 11/1931 | Aufderheide | 52/140 |
| 3,393,489 | 7/1968 | Oliver | 52/689 |
| 3,568,626 | 3/1971 | Southworth, Jr. . | |
| 3,788,025 | 1/1974 | Holmes | 52/686 |
| 3,916,821 | 11/1975 | Pies . | |
| 4,185,425 | 1/1980 | Merkel . | |
| 4,699,838 | 10/1987 | Gilbert . | |
| 4,905,725 | 3/1990 | Sinkinson et al. . | |
| 5,200,704 | 4/1993 | Clark, Jr. et al. . | |
| 5,291,703 | 3/1994 | Ziegler . | |

FOREIGN PATENT DOCUMENTS

| | | | |
|---|---|---|---|
| 213175 | 3/1924 | United Kingdom | 16/125 |

*Primary Examiner*—Michael Safavi
*Attorney, Agent, or Firm*—Robert A. Seemann

[57] ABSTRACT

A concrete cover for a subterranean construction includes a cast-in plastic handle which holds a piece of rebar in the cover and removably holds a piece of rebar externally of the cover.

5 Claims, 3 Drawing Sheets

HANDLE FOR SUBTERRANEAN CONCRETE COVERS

BACKGROUND OF THE INVENTION

1. Field of the Invention

This invention pertains to a handle for concrete and other heavy nonmetallic covers that are buried below grade, such as covers and inspection lids for septic tanks, wells, and concrete and plastic liquid distribution boxes, that provides means for indication of the location of the cover.

2. Description of the Prior Art

The need for marking the location of subterranean structures in the field of building and construction is well recognized, resulting in many designs.

U.S. Pat. No. 3,568,626, patented by Hamilton Southworth, Jr., Mar. 9, 1971, describes a ribbon of infrangible, stretchable strips which are buried in the soil over buried utilities such as electric lines, gas lines, or water lines, to provide warning of the existence of the utilities to a worker excavating over the utilities. The warning is provided when the excavating machinery catches and draws up a portion of the strip and it is seen by the worker. Coding means of a magnetic or radioactive type are applied to the strip before burial of the strip so that once the strip is discovered at the point of excavation, the worker can then determine the subterranean location or run of the utility line by following above ground with suitable sensors, the path of the underground ribbon.

U.S. Pat. No. 3,916,821, patented by Othmar W. Pies, Nov. 4, 1975 discloses a marker assembly comprising a permanent magnet surrounded by a housing having an upright socket for receiving a stake. When the stake is driven into the ground with the housing below the surface of the ground, the stake can be found from above the ground by a magnetic dipping needle.

U.S. Pat. No. 4,699,838, patented by Ronald E. Gilbert, Oct. 13, 1987, describes a reinforced metallic tape marker which is buried over underground plastic, ceramic, concrete, and other nonmetallic utilities, that resists tearing during backfilling of the trench in which the utility with overlaying tape are buried.

SUMMARY OF THE INVENTION

It is one object of the invention to provide means for marking the location of a subterranean structure.

It is another object that the means for marking comprise an element of the structure.

It is another object that the means for marking be light in weight for shipping and storage.

It is another object that the means for marking can be made in part from material which is ordinarily discarded at a construction job site.

It is another object that the means for marking comprise a plastic handle for a cover of a subterranean structure, and that steel rebar commonly found at a construction job site can be used to complete construction of the plastic handle means for marking.

Other objects and advantages will become apparent to a reader of the following description of the invention.

A plastic handle for a nonmetallic cover of an element of subterranean installment includes means for receiving by way of insertion a metal marker of substantial mass.

Preferably the means for receiving includes means for holding the metal so that is removable, and the means for receiving has a shape that closely receives rebar.

BRIEF DESCRIPTION OF THE DRAWINGS

In order that the invention be more fully comprehended, it will now be described, by way of example, with reference to the accompaniny drawings, in which.

DESCRIPTION OF THE PREFERRED EMBODIMENTS

Figure 1:
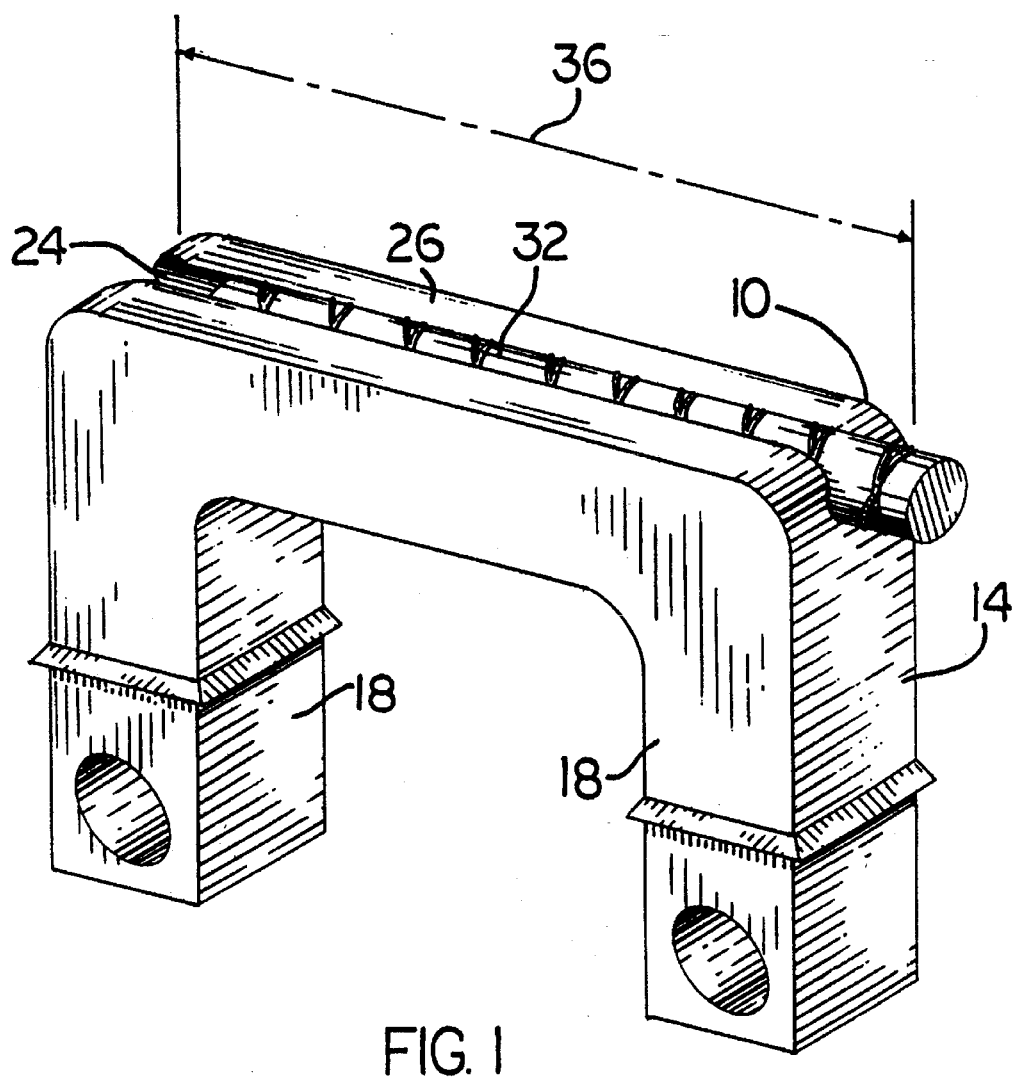
FIG. 1 is a vertical perspective view of a handle according to the present invention.

Before explaining the invention in detail, it is to be understood that the invention is not limited in its application to the detail of construction and arrangement of parts illustrated in the drawings since the invention is capable of other embodiments and of being practiced or carried out in various ways. It is also to be understood that the phraseology or terminology employed is for the purpose of description only and not of limitation.

Referring to FIG. 1, body 14 of handle 10 is constructed throughout of engineered plastic such as Dupont 801 (tm). It is designed to be gripped by hand, but can be engaged by cable or other lifting means, as the handle can be manufactured to a 2,000 pound rating.

Legs 18 are designed to be inserted into a concrete, plastic or other nonmetallic cover for an element of construction such as a septic tank, pump chamber, distribution box, and well, that are buried in the ground, in which the cover is buried below grade or below the soil and is out of sight.

Often after below ground installation of the element of construction and cover, a lawn or other valuable overlying surface is developed. When it is time to inspect, clean or otherwise access the interior of the element of construction, it is desirous to find the exact location of the cover and dig straight down so as to disturb as little of the overlying development as possible.

The handle of the present invention is designed to provide a mark of the location of the cover through use of a metal detector. Many metal detector designs which can detect the fully assembled handle below ground are presently available on the market, such as from Radio Shack (tm), a division of Tandy Corp., Fort Worth, Tex.

Handle 10 includes slot 24 in top 26 of the handle, for receiving a metal bar. In a preferred embodiment of the invention, slot 24 is shaped to receive rebar 32 that is commonly used in construction. Preferably slot 24 is shaped to receive the rebar by insertion of the rebar from one end of the slot axially into the slot, and to prevent withdrawal of the rebar radially from the slot. A portion of the top therefor extends over each side of the rebar.

Portions of rebar often abound as scrap on construction sites. Cutting tools for quickly cutting the rebar are also commonly available on construction sites. A portion of rebar is cut preferably to about the length 36 of slot 24, and is inserted into slot 24 at the construction site.

The handle with rebar provides a high quality marker for detection equipment because the rebar presents to the metal detector a substantially large ferrous mass that is easy to detect for most detectors.

The handle can be economically molded without the cost in dies and labor of molding-in a remotely detectable marker of the quality of rebar.

Figure 2:
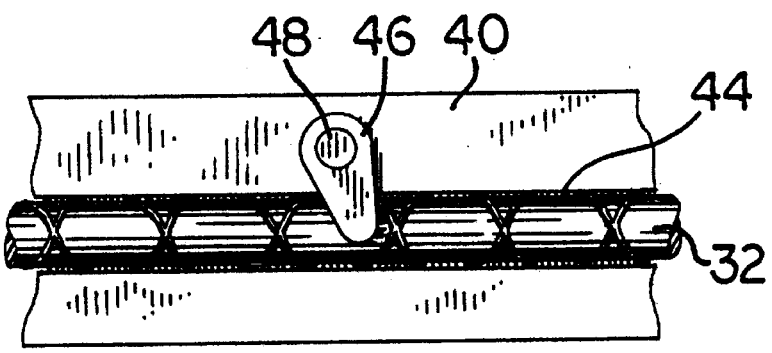
FIG. 2 is a view of a portion of a handle showing a retaining means.

In FIG. 2, top 40 of a handle of the present invention includes slot 44 which is shaped to receive rebar 32 axially or radially, and to cradle rebar selected from several diameters normally used in construction. Retainer means such as rotary catch 46 prevents radial removal of the rebar when the catch is rotated on pivot 48 to a position over the rebar in the slot.

Figure 3:
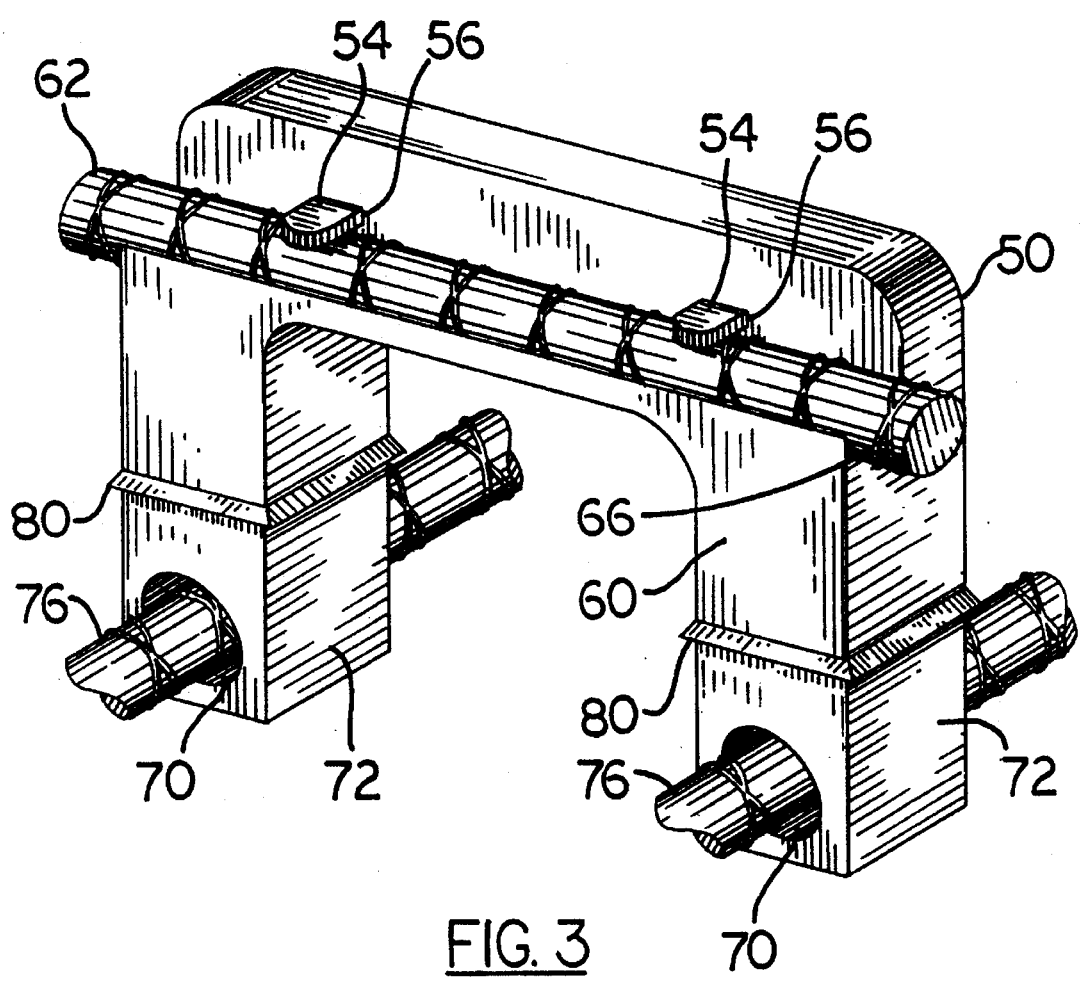
FIG. 3 is a vertical perspective view of another handle according to the present invention.

Handle 50 in FIG. 3 includes retainer pegs 54 which are inserted into slots 56 in side wall 60 of the handle after rebar piece 62 is inserted obliquely into slot 66 in side wall 60.

Holes 70 in legs 72 hold rebar 76 pieces which increase retention strength of the legs in a cover. Stops 80 help set the depth to which the legs are inserted into the cover when the handle is inserted into the cover material for molding or casting it into the cover.

Figure 4:
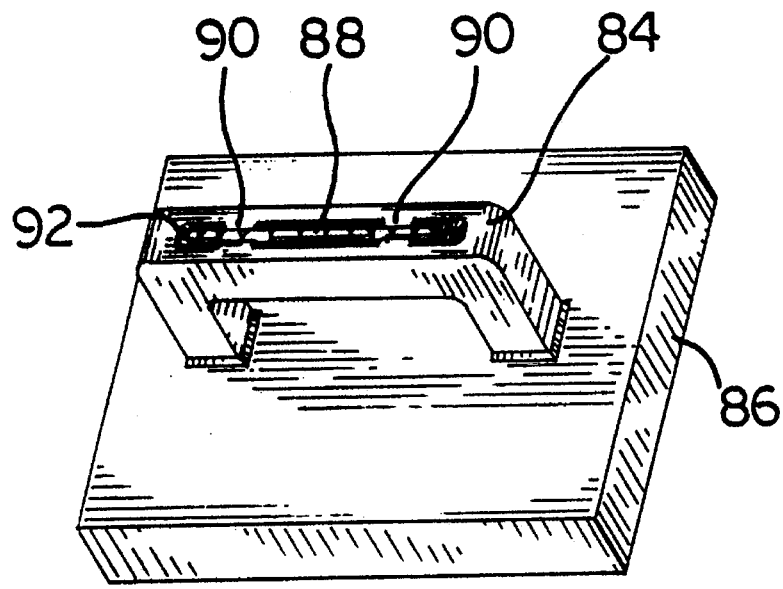
FIG. 4 is a vertical perspective view of a handle and cover according to the present invention.

In FIG. 4, handle 84 is mounted in inspection lid 86, and holds rebar 88 behind protrusions 90 of the handle. Protrusions 90 yield sufficiently to permit radial insertion of the rebar past the protrusions, into a depression 92 in the handle, and to resist removal of the rebar once so installed.

Figure 5:
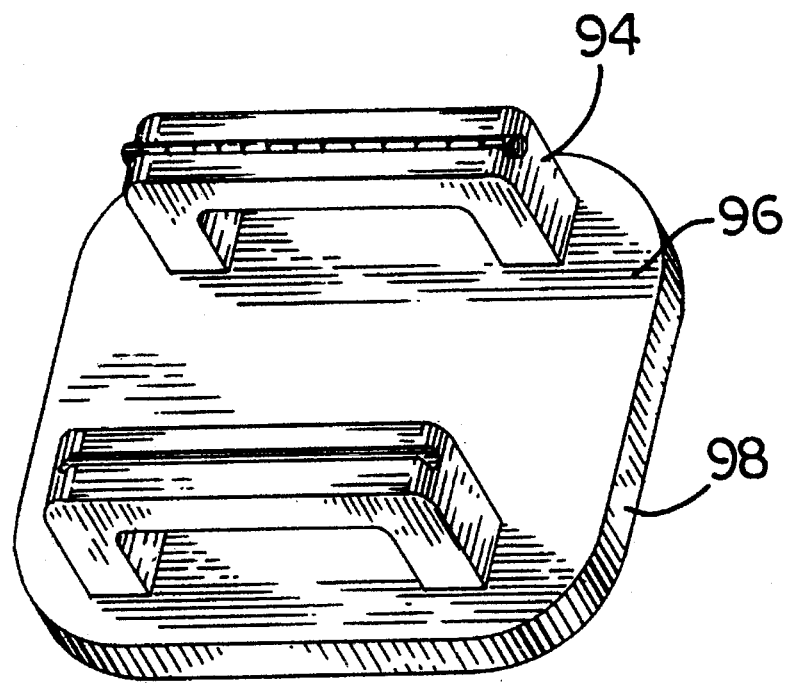
FIG. 5 is a vertical perspective of a handle and cover according to the present invention.

In FIG. 5, handle 94 is bolted to top 96 of cover 98 from below the cover. The other cover on the handle is installed in the cover without rebar, as a second handle, as a second marker was needed.

Although the present invention has been described with respect to details of certain embodiments thereof, it is not intended that such details be limitations upon the scope of the invention. It will be obvious to those skilled in the art that various modifications and substitutions may be made without departing from the spirit and scope of the invention as set forth in the following claims.

I claim:

1. An assembly comprising in combination: a concrete cover for a subterranean construction, a plastic handle comprising a first end and a second end, said first end being cast in said concrete cover, and said second end being external of said cover, a first piece of rebar mounted on said second end, and a second piece of rebar held by said first end in said cover.

2. The assembly of claim 1, further comprising:

said first piece of rebar being held by said second end so that said first piece is removable from said second end.

3. An assembly comprising in combination:

a concrete cover for a subterranean construction, a plastic handle comprising a first end and a second end, said first end being attached to said cover, said second end being external to said cover, a first piece of rebar mounted on said second end.

4. The assembly of claim 3, further comprising:

said first piece of rebar being held by said second end so that said first piece of rebar is removable from said second end.

5. An assembly comprising in combination:

a concrete cover for a subterranean construction, a plastic handle comprising a first end and a second end, said first end being cast in said concrete cover, and said second end being external of said cover, a piece of rebar held by said first end in said cover, and a metal marker of substantial mass being mounted on said second end for sensing the location of said cover.

* * * * *